(12) United States Patent
Stewart et al.

(10) Patent No.: US 11,421,337 B2
(45) Date of Patent: Aug. 23, 2022

(54) ELECTROLYTIC ON-SITE GENERATOR

(71) Applicant: De Nora Holdings US, Inc., Concord, OH (US)

(72) Inventors: William J Stewart, Albuquerque, NM (US); Matthew R Santillanes, Albuquerque, NM (US); Kevin Schwarz, Albuquerque, NM (US); Justin Sanchez, Albuquerque, NM (US); Geofrey C Showalter, Moriarty, NM (US); Kyle Lee, Albuquerque, NM (US)

(73) Assignee: De Nora Holdings US, Inc., Concord, OH (US)

( * ) Notice: Subject to any disclaimer, the term of this patent is extended or adjusted under 35 U.S.C. 154(b) by 190 days.

(21) Appl. No.: 16/526,144

(22) Filed: Jul. 30, 2019

(65) Prior Publication Data
US 2019/0376204 A1    Dec. 12, 2019

Related U.S. Application Data

(60) Division of application No. 15/064,385, filed on Mar. 8, 2016, now Pat. No. 10,400,349, which is a division
(Continued)

(51) Int. Cl.
*C25F 1/00* (2006.01)
*C02F 1/467* (2006.01)
(Continued)

(52) U.S. Cl.
CPC ............. *C25F 1/00* (2013.01); *C02F 1/4674* (2013.01); *C25B 1/14* (2013.01); *C25B 1/26* (2013.01);
(Continued)

(58) Field of Classification Search
CPC ........... C25B 11/036; C25B 9/00; C25B 9/70; C25B 9/73; C25B 9/75; C25B 1/13; C25B 1/24; C25B 1/26; C25B 1/30; C25B 15/08
See application file for complete search history.

(56) References Cited

U.S. PATENT DOCUMENTS 3,234,110 A    2/1966  Bernard
3,479,263 A   11/1969  Heitman
(Continued)

FOREIGN PATENT DOCUMENTS

DE    3704955 A1    8/1988
DE    19752111 C1   2/1999
(Continued)

OTHER PUBLICATIONS

"Winier 2004 CBE Technical Advisory Conference", Feb. 5-6, 2004, Montana State University-Bozeman, Bozeman, Montana, Feb. 2004.
(Continued)

*Primary Examiner* — Salil Jain
(74) *Attorney, Agent, or Firm* — BakerHostetler

(57) ABSTRACT

Method and apparatus for a low maintenance, high reliability on-site electrolytic generator incorporating automatic cell monitoring for contaminant film buildup, as well as automatically removing or cleaning the contaminant film. This method and apparatus preferably does not require human intervention to clean. For high current density cells, cleaning is preferably performed by reversing the polarity of the electrodes and applying a lower current density to the electrodes, preferably by adjusting the salinity or brine concentration of the electrolyte while keeping the voltage constant. Electrolyte flow preferably comprises water and brine flows which are preferably separately monitored and automatically adjusted. For bipolar cells, flow between modules arranged in parallel is preferably approximately
(Continued)

equally distributed between modules and between intermediate electrodes within each module.

11 Claims, 6 Drawing Sheets

Related U.S. Application Data of application No. 14/154,579, filed on Jan. 14, 2014, now abandoned, which is a division of application No. 13/198,276, filed on Aug. 4, 2011, now abandoned, which is a continuation-in-part of application No. 12/473,744, filed on May 28, 2009, now abandoned, which is a continuation-in-part of application No. 11/946,772, filed on Nov. 28, 2007, now Pat. No. 7,922,890.

(60) Provisional application No. 61/371,585, filed on Aug. 6, 2010, provisional application No. 61/371,490, filed on Aug. 6, 2010, provisional application No. 61/056,718, filed on May 28, 2008, provisional application No. 60/867,557, filed on Nov. 28, 2006.

(51) Int. Cl.

| | | |
|---|---|---|
| C25B 15/08 | (2006.01) | |
| C25B 9/70 | (2021.01) | |
| C25B 11/036 | (2021.01) | |
| C25B 15/02 | (2021.01) | |
| C25B 1/14 | (2006.01) | |
| C25B 1/26 | (2006.01) | |
| C02F 1/00 | (2006.01) | |
| C02F 1/461 | (2006.01) | |

(52) U.S. Cl.
CPC .......... *C25B 9/70* (2021.01); *C25B 11/036* (2021.01); *C25B 15/02* (2013.01); *C25B 15/08* (2013.01); *C02F 1/006* (2013.01); *C02F 1/008* (2013.01); *C02F 2001/46119* (2013.01); *C02F 2001/46128* (2013.01); *C02F 2001/46185* (2013.01); *C02F 2201/007* (2013.01); *C02F 2201/4611* (2013.01); *C02F 2201/4613* (2013.01); *C02F 2201/4614* (2013.01); *C02F 2201/4615* (2013.01); *C02F 2201/4616* (2013.01); *C02F 2201/46135* (2013.01); *C02F 2201/46145* (2013.01); *C02F 2209/02* (2013.01); *C02F 2209/03* (2013.01); *C02F 2209/05* (2013.01); *C02F 2209/42* (2013.01); *C02F 2303/22* (2013.01)

(56) References Cited

U.S. PATENT DOCUMENTS

| | | |
|---|---|---|
| 3,541,741 A | 11/1970 | Czubak |
| 3,799,850 A | 3/1974 | Entshev et al. |
| 4,085,028 A | 4/1978 | McCallum |
| 4,087,337 A | 5/1978 | Bennett |
| 4,088,550 A | 5/1978 | Malkin |
| 4,416,746 A | 11/1983 | Kerby et al. |
| 4,479,864 A | 10/1984 | Kanai et al. |
| 4,500,404 A | 2/1985 | Tucker |
| 4,532,018 A | 7/1985 | Wright et al. |
| 4,555,323 A | 11/1985 | Collier |
| 4,710,233 A | 12/1987 | Hohmann et al. |
| 4,761,208 A | 8/1988 | Gram et al. |
| 4,767,511 A | 8/1988 | Aragon |
| 4,908,109 A | 3/1990 | Wright |
| 5,254,226 A | 10/1993 | Williams et al. |
| 5,316,740 A | 5/1994 | Baker et al. |
| 5,385,711 A | 1/1995 | Baker et al. |
| 5,545,311 A | 8/1996 | Neville |
| 5,624,535 A | 4/1997 | Tsuchikawa et al. |
| 5,833,834 A | 11/1998 | Hanrahan et al. |
| 5,853,562 A | 12/1998 | Eki et al. |
| 6,022,459 A | 2/2000 | Briggs |
| 6,056,666 A | 5/2000 | Williams |
| 6,096,202 A | 8/2000 | Fulmer |
| 6,106,691 A | 8/2000 | Nakamura et al. |
| 6,117,285 A | 9/2000 | Welch et al. |
| 6,146,586 A | 11/2000 | McLeod et al. |
| 6,149,810 A | 11/2000 | Gonzalez-Martin et al. |
| 6,174,419 B1 | 1/2001 | Akiyama |
| 6,228,251 B1 | 5/2001 | Okazaki |
| 6,258,250 B1 | 7/2001 | Weissenbacher et al. |
| 6,277,265 B1 | 8/2001 | Hanak |
| 6,309,523 B1 | 10/2001 | Prasnikar et al. |
| 6,315,886 B1 | 11/2001 | Zappi et al. |
| 6,344,132 B1 | 2/2002 | Hirayama et al. |
| 6,358,398 B1 | 3/2002 | Halldorson et al. |
| 6,371,315 B1 | 4/2002 | Chien et al. |
| 6,514,401 B2 | 2/2003 | Chyou et al. |
| 6,524,475 B1 | 2/2003 | Herrington et al. |
| 6,632,347 B1 | 10/2003 | Buckley et al. |
| 6,736,966 B2 | 5/2004 | Herrington et al. |
| 6,929,740 B2 | 8/2005 | Hayes |
| 7,897,022 B2 | 3/2011 | Simmons et al. |
| 2002/0139689 A1 | 10/2002 | Zolotarsky et al. |
| 2004/0195090 A1 | 10/2004 | Omasa |
| 2004/0195104 A1 | 10/2004 | Minato |
| 2006/0053572 A1 | 3/2006 | Porat |
| 2006/0137973 A1 | 6/2006 | Herrington |
| 2007/0207053 A1 | 9/2007 | Doyle et al. |
| 2008/0237054 A1 | 10/2008 | Sanchez et al. |
| 2008/0299006 A1 | 12/2008 | Ikemizu |
| 2009/0229992 A1 | 9/2009 | Sanchez et al. |
| 2010/0086829 A1* | 4/2010 | Ridley .................. H01M 8/184 429/498 |
| 2010/0187122 A1 | 7/2010 | Zolotarsky et al. |
| 2011/0079520 A1 | 4/2011 | Tretheway et al. |
| 2013/0087450 A1 | 4/2013 | Antozzi et al. |

FOREIGN PATENT DOCUMENTS

| | | |
|---|---|---|
| EP | 1074515 A2 | 2/2001 |
| FR | 2644155 A1 | 9/1990 |
| JP | 0350466 | 9/1990 |
| JP | 01294885 | 9/1990 |
| JP | 2000042556 A | 2/2000 |
| JP | 2000153274 A | 6/2000 |
| JP | 2000189971 A | 7/2000 |
| JP | 2001029435 A | 2/2001 |
| JP | 2004113873 A | 4/2004 |
| JP | 2004162086 A | 6/2004 |
| JP | 2004216349 A | 8/2004 |
| JP | 2004531647 A | 10/2004 |
| JP | 2005058947 A | 3/2005 |
| JP | 2005350716 A | 12/2005 |
| KR | 20020074262 A | 9/2002 |
| WO | 8300052 A1 | 1/1983 |
| WO | 9713555 A1 | 4/1997 |
| WO | 9845503 A1 | 10/1998 |
| WO | 0110215 A1 | 2/2001 |
| WO | 2006135814 A2 | 12/2006 |
| WO | 2007057940 A1 | 5/2007 |
| WO | 2007065228 A1 | 6/2007 |
| WO | 2009150646 A2 | 12/2009 |
| WO | 2009155044 A2 | 12/2009 |

OTHER PUBLICATIONS

Rabinovitch, et al., "Removal and Inactivation of *Staphylococcus epidermidis* BioFilms by Electrolysis", Applied and Environmental Microbiology, Sep. 2006, 6364-6366.

* cited by examiner

ELECTROLYTIC ON-SITE GENERATOR

CROSS REFERENCE TO RELATED APPLICATIONS

This application is a divisional application of now-allowed U.S. patent application Ser. No. 15/064,385, entitled "Electrolytic On-Site Generator", filed Mar. 8, 2016, which is a divisional application of U.S. patent application Ser. No. 14/154,579, entitled "Electrolytic On-Site Generator", filed on Jan. 14, 2014, which application is a divisional application of U.S. patent application Ser. No. 13/198,276, entitled "Electrolytic On-Site Generator", filed on Aug. 4, 2011, which application claims priority to and the benefit of filing of U.S. Provisional Patent Application Ser. No. 61/371,585, entitled "Low Maintenance Electrolytic On-Site Generator," filed on Aug. 6, 2010 and U.S. Provisional Patent Application Ser. No. 61/371,490, entitled "Reverse Polarity Cleaning and Electronic Flow Control Systems for Low Intervention Electrolytic Chemical Generators," filed on Aug. 6, 2010; which application is also a continuation-in-part application of U.S. patent application Ser. No. 12/473,744, entitled "Reverse Polarity Cleaning and Electronic Flow Control Systems for Low Intervention Electrolytic Chemical Generators", filed on May 28, 2009, which application claims priority to and the benefit of filing of U.S. Provisional Patent Application Ser. No. 61/056,718, entitled "Reverse Polarity Cleaning for High Current Density Electrolytic Cells," filed on May 28, 2008, and which application is a continuation-in-part application of U.S. patent application Ser. No. 11/946,772, entitled "Low Maintenance On-Site Generator", filed on Nov. 28, 2007 (which issued as U.S. Pat. No. 7,922,890 on Apr. 12, 2011), which application claims priority to and the benefit of filing of U.S. Provisional Patent Application Ser. No. 60/867,557, entitled "Low Maintenance On-Site Generator", filed on Nov. 28, 2006. All of the foregoing applications are incorporated herein by reference in their entireties for any and all purposes.

TECHNICAL FIELD

The present invention relates to an electrolytic on-site generator which is nearly free of maintenance.

BACKGROUND

Note that the following discussion refers to a number of publications and references. Discussion of such publications herein is given for more complete background of the scientific principles and is not to be construed as an admission that such publications are prior art for patentability determination purposes.

Electrolytic technologies utilizing dimensionally stable anodes have been developed to produce mixed-oxidants and sodium hypochlorite solutions from a sodium chloride brine solution. Dimensionally stable anodes are described in U.S. Pat. No. 3,234,110 to Beer, entitled "Electrode and Method of Making Same," wherein a noble metal coating is applied over a titanium substrate. Electrolytic cells have had wide use for the production of chlorine and mixed oxidants for the disinfection of water. Some of the simplest electrolytic cells are described in U.S. Pat. No. 4,761,208, entitled "Electrolytic Method and Cell for Sterilizing Water", and U.S. Pat. No. 5,316,740, entitled "Electrolytic Cell for Generating Sterilizing Solutions Having Increased Ozone Content."

Electrolytic cells come in two varieties. The first category comprises divided cells that utilize membranes to maintain complete separation of the anode and cathode products in the cells. The second category comprises undivided cells that do not utilize membranes, but that also do not suffer nearly as much from issues associated with membrane fouling. However, it is well accepted that one of the major failure mechanisms of undivided electrolytic cells is the buildup of unwanted films on the surfaces of the electrodes. The source of these contaminants is typically either from the feed water to the on-site generation process or contaminants in the salt that is used to produce the brine solution feeding the system. Typically these unwanted films consist of manganese, calcium carbonate, or other unwanted substances. If buildup of these films is not controlled or they are not removed on a fairly regular basis, the electrolytic cells will lose operating efficiency and will eventually catastrophically fail (due to localized high current density, electrical arcing or some other event). Typically, manufacturers protect against this type of buildup by incorporating a water softener on the feed water to the system to prevent these contaminants from ever entering the electrolytic cell. However, these contaminants will enter the process over time from contaminants in the salt used to make the brine. High quality salt is typically specified to minimize the incidence of cell cleaning operations. Processes are well known in the art for purifying salt to specification levels that will avoid contaminants from entering the cell. However, these salt cleaning processes, although mandatory for effective operation of divided cells, are considered too complicated for smaller on-site generation processes that utilize undivided cells.

U.S. patent application Ser. No. 11/287,531, which is incorporated herein by reference, is directed to a carbonate detector and describes one possible means of monitoring an electrolytic cell for internal film buildup. Other possible means for monitoring carbonate buildup in cells that utilize constant current control schemes is by monitoring the rate of brine flow to the cell. As brine flow increases, it is usually, but not always, indicative of carbonate formation on the cathode electrode which creates electrical resistance in the cell. Other than these methods and/or visual inspection of the internal workings of a cell, there currently is not an adequate method of monitoring the internal status of the buildup on an electrolytic cell.

The current accepted method of cleaning an electrolytic cell is to flush it with an acid (often muriatic or hydrochloric acid) to remove any deposits which have formed. Typically, manufacturers recommend performing this action on a regular basis, at least yearly, but sometimes as often as on a monthly basis. Thus there is a need for a more reliable method for insuring cleanliness of the electrolytic cell is to perform a cleaning process on an automated basis that does not require the use of a separate supply of consumables such as muriatic or hydrochloric acid, and that does not require operator intervention.

U.S. Pat. No. 5,853,562 to Eki, et al. entitled "Method and Apparatus for Electrolyzing Water" describes a process for reversing polarity on the electrodes in a membraneless electrolytic cell for the purpose of removing carbonate scale and extending the life of the electrolytic cell. This method of electrolytic cell cleaning is routinely used in flow through electrolytic chlorinators that convert sodium chloride salt in swimming pool water to chlorine via electrolysis. However, currently used flow through electrolytic cells are constructed of electrodes (anode and cathode) that both have common catalytic coatings. As electrical polarity is changed, the old cathode becomes the anode, and the anode becomes the cathode. Special catalytic coatings have been developed for these applications, For instance, Eltech Corporation has developed the EC-600 coating specifically for the swimming pool chlorination market. Sodium chloride is typically added to the pool water raising the total dissolved solids (TDS) content to approximately 4 to 5 grams per liter. At these TDS values, the current density in the swimming pool electrolytic cells is relatively low. The special anode coatings for pool applications are designed to tolerate these low current densities for extended periods with polarity applied in either direction. However, most dimensionally stable anodes for chlorine production in membraneless electrolytic cells producing chlorine at 8 gram per liter (8,000 mg/L) concentration of free available chlorine (FAC) cannot tolerate high current densities (greater than approximately 1 amp per square inch) in reverse polarity mode. Thus, although simply reversing the polarity works for low current density electrolytic cells, it will not work for electrolytic cells which normally operate at a high current density, since the anode will be damaged if high current density is applied during the reverse polarity cleaning operation.

One of the other maintenance items for electrolytic generators is the requirement that operators occasionally measure and set water flow into the system. The flow through the generator can vary greatly with incoming and outgoing water pressure and/or contaminant buildup in the system or electrolytic cells. Typically, measurements are made with either flowmeters or with timed volume measurements, and adjustments to the flow are performed with manual valves. Keeping the electrolytic generator operating within flow specifications is important, as it ensures reliable long term operation the generator within its efficiency specifications.

SUMMARY

Embodiments of the present invention are related to a method for operating an electrolytic cell, the method comprising the steps of supplying brine to an electrolytic cell, producing one or more oxidants in the electrolytic cell, detecting a level of contaminant buildup, automatically stopping the brine supply after an upper contaminant threshold is detected, automatically cleaning the electrolytic cell, thereby reducing contaminants in the electrolytic cell, and automatically continuing to produce the one or more oxidants after a lower contaminant threshold is detected. The cleaning step preferably comprises providing brine to an acid generating electrolytic cell, generating an acid in the acid generating electrolytic cell, and introducing the acid into the electrolytic cell. The acid preferably comprises muriatic acid or hydrochloric acid. The method preferably further comprises the step of diluting the brine. The detecting step preferably comprises utilizing a carbonate detector. The detecting step preferably comprises measuring the rate of brine consumption in the electrolytic cell, optionally by measuring a quantity selected from the group consisting of flow meter output, temperature of the electrolytic cell, brine pump velocity, and incoming water flow rate. The method preferably further comprises comparing the rate of brine consumption to the rate of brine consumption in a clean electrolytic cell. The cleaning step optionally comprises using an ultrasonic device and/or using a magnetically actuated mechanical electrode cleaning device, or reversing the polarity of electrodes in the electrolytic cell, thereby lowering the pH at a cathode.

Embodiments of the present invention also are related to an apparatus for producing an oxidant, the apparatus comprising a brine supply, an electrolytic cell, an acid supply, and a control system for automatically introducing acid from the acid supply into the electrolytic cell. The acid supply preferably comprises a second electrolytic cell, and the brine supply preferably provides brine to the second electrolytic cell during a cleaning cycle. The apparatus preferably further comprises a variable speed brine pump, a carbonate detector, one or more thermowells for measuring a temperature of said electrolytic cell, and/or one or more flowmeters for measuring the brine flow rate.

Embodiments of the present invention also are related to an apparatus for producing an oxidant, the apparatus comprising a brine supply, an electrolytic cell, a cleaning mechanism in the electrolytic cell, and a control system for automatically activating the cleaning mechanism. The cleaning mechanism preferably is selected from the group consisting of ultrasonic horn, magnetically actuated electrode mechanical cleaning device, and acidic solution at a cathode surface. The apparatus preferably further comprises a device selected from the group consisting of a carbonate detector, at least one thermowell for measuring a temperature of said electrolytic cell, and a flowmeter for measuring a brine flow rate.

Embodiments of the present invention also are related to a method for cleaning an electrolytic cell comprising electrodes, the method comprising the steps of reversing polarities of two or more of the electrodes and providing a cleaning current density to the electrodes which is lower than an operational current density used during normal operation of the electrolytic cell. During normal operation the electrolytic cell preferably produces a concentration of free available chlorine greater than approximately four grams per liter, more preferably greater than approximately five grams per liter, and most preferably approximately eight grams per liter. The operational current density is preferably greater than approximately one amp per square inch. The cleaning current density is preferably less than approximately 20% of the operational current density, and more preferably between approximately 10% and approximately 15% of the operational current density. The providing step is preferably performed for less than approximately thirty minutes, and more preferably for between approximately five minutes and approximately ten minutes. The reversing step optionally comprises using at least one power supply relay or other switching device. The operational current density is preferably provided by an operational power supply and the cleaning current density is preferably provided by a separate cleaning power supply. The power producing capacity of the cleaning power supply is preferably smaller than the power producing capacity of the operational power supply. The method preferably further comprises the step of monitoring a flow rate of electrolyte through the electrolytic cell. The monitoring step is preferably performed using a flowmeter, a rotameter, or a pressure transducer, or monitoring a temperature difference across the electrolytic cell via a first thermocouple or thermowell disposed at an inlet of the electrolytic cell a second thermocouple or thermowell disposed at an outlet of the electrolytic cell. The method preferably further comprises the step of automatically adjusting the flow rate, and preferably further comprises the step of initiating a cleaning cycle at a predetermined flow rate.

Embodiments of the present invention also are related to a method for cleaning an electrolytic cell comprising electrodes, the method comprising the steps of reversing polarities of two or more of the electrodes and providing a cleaning voltage potential difference to the electrodes which is lower than an operational voltage potential difference used during normal operation of the electrolytic cell. During normal operation the electrolytic cell preferably produces a concentration of free available chlorine greater than approximately five grams per liter. The providing step is preferably performed for a time between approximately five minutes and approximately ten minutes. The reversing step preferably comprises using at least one power supply relay or other switching device. The operational voltage potential difference is preferably provided by an operational power supply and the cleaning voltage potential difference is preferably provided by a separate cleaning power supply. The method preferably further comprises the steps of monitoring a flow rate of electrolyte through the electrolytic cell and automatically adjusting the flow rate.

Embodiments of the present invention also are related to an apparatus for producing electrolytic products, the apparatus comprising an electrolytic cell comprising electrodes; a first power supply for providing a first current density to the electrodes, a second power supply for providing a second current density to the electrodes, the second power supply having an opposite polarity to the first power supply, wherein the second current density is smaller than the first current density. The electrolytic cell preferably produces a concentration of free available chlorine greater than approximately five grams per liter. The second current density is preferably between approximately 10% and approximately 15% of the first current density. The apparatus preferably further comprises at least one power supply relay or other switching device, and preferably comprises a flow monitoring device for monitoring a flow rate of electrolyte through the electrolytic cell. The flow monitoring device is preferably selected from the group consisting of a flowmeter, a rotameter, a pressure transducer, a pair of thermocouples, and a pair of thermowells. If a pair of thermocouples or thermowells is used, one thermocouple or thermowell is preferably disposed at an inlet of the electrolytic cell and another thermocouple or thermowell is preferably disposed at an outlet of the electrolytic cell. The apparatus preferably further comprises an electronically operated valve for adjusting the flow rate.

An embodiment of the present invention is a method for operating an electrolytic cell, the method comprising monitoring a brine flow rate, monitoring a water flow rate and pressure, forming an electrolyte by mixing brine and water, automatically and separately adjusting the brine flow rate and the water flow rate so that a pressure and flow rate of the electrolyte are within predetermined limits prior to electrolysis of the electrolyte, and electrolyzing the electrolyte. Automatically and separately adjusting the brine flow rate and the water flow rate preferably ensures that a salinity and/or concentration of the electrolyte are within predetermined limits prior to electrolysis of the electrolyte. The method preferably further comprises monitoring an electrolyte temperature and/or an oxidant temperature. The method preferably further comprises reducing the pressure of the water to an electrolysis operating pressure. The method preferably further comprises stopping electrolysis to avoid damage caused by incoming water pressure being too high or too low. Automatically and separately adjusting the brine flow rate and the water flow rate is preferably performed in response to an electrolyte temperature, an oxidant temperature, an electrolysis current density, a water flow rate, a water pressure, a brine flow rate, or combinations thereof. The method preferably further comprises selecting a low threshold amount of oxidant in an oxidant tank which signals initiation of electrolysis and initiating electrolysis of the electrolyte when electricity costs are low even though an oxidant amount in the oxidant tank is higher than the low threshold amount.

An embodiment of the present invention is an apparatus for performing electrolysis, the apparatus comprising a brine input line comprising a variable speed brine pump and an on-off switch, a water input line comprising a pressure sensor, a flow meter, and a flow control valve, a connection between the brine input line and the water input line, an electrolytic cell, and an oxidant tank. The apparatus preferably further comprises a pressure reducing valve on the water input line a check valve on the brine input line, a temperature measuring device for measuring an electrolyte temperature, and/or a temperature measuring device for measuring an oxidant temperature. The apparatus preferably further comprises a controller for separately controlling operation of the variable speed brine pump and the water flow control valve. The controller preferably operates in response to one or more inputs selected from the group consisting of an electrolyte temperature, an oxidant temperature, a current density in the electrolytic cell, a water flow rate, a water pressure, and a brine flow rate.

An embodiment of the present invention is a method of cleaning an electrolytic cell, the method comprising lowering a salinity of an electrolyte until a current density of the electrolytic cell falls to or below a predetermined cleaning current density, reversing a electrode polarity, maintaining a constant electrode voltage, ceasing a flow of water into the electrolytic cell, operating the electrolytic cell until the current density increases to or above the predetermined cleaning current density, starting the flow of water into the electrolytic cell until the current density decreases to or below the predetermined current density, and repeating the ceasing, operating, and starting steps. Repeating the ceasing, operating, and starting steps preferably physically dislodges contaminants from the cell. A flow of brine into the electrolytic cell and a flow of water into the electrolytic cell are preferably independently controllable. The lowering step preferably comprises stopping the flow of brine. The method optionally further comprises increasing a salinity of electrolyte if the current density does not increase sufficiently during the operating step. The method is preferably performed when an amount of oxidant in an oxidant tank is at or below a predetermined low threshold amount and after the occurrence of a predetermined event selected from the group consisting of a time period elapsing, exceeding an operation time of the cell, exceeding an amount of electrolyte flow through the cell, and reaching a contamination level. The method preferably further comprises initiating normal operation of the electrolytic cell substantially immediately after cleaning is complete and flushing debris such as scale flakes from the electrolytic cell once cleaning is complete. The method is preferably performed in approximately three to five minutes. The repeating step is preferably performed approximately every thirty seconds. The method is preferably performed approximately once per month. The predetermined cleaning current density and the total cleaning time are preferably chosen to expose the electrolytic cell to a predetermined amount of amp-seconds, such as 1800 amp-seconds.

An embodiment of the present invention is a bipolar electrolytic cell comprising a plurality of modules arranged in parallel, each module comprising primary electrodes and one or more intermediate electrodes; a manifold for distributing electrolyte substantially evenly between each module; a flow barrier in each module located inside an electrolyte inlet; and a gap region in each module or openings in one or more of the intermediate electrodes to facilitate uniformity of electrolyte and oxidant flow in the electrolytic cell; wherein a general flow direction of electrolyte in each module is parallel to the electrodes. The flow barrier preferably blocks electrolyte entering each module from flowing directly between the electrodes. The gap region is optionally formed by the shape of the intermediate electrodes or by the size of an edge protector. The edge protector preferably comprises one or more grooves for receiving and holding the intermediate electrodes and preferably comprises chlorinated polyvinyl chloride (CPVC) or Viton®. The edge protector is preferably replaceable by a different size edge protector, thereby enabling a single module housing to accommodate different sizes of intermediate electrodes. The openings on an intermediate electrode are preferably staggered or offset from openings in adjacent intermediate electrodes.

An embodiment of the present invention is also a method of operating a bipolar electrolytic cell, the method comprising substantially evenly distributing a flow of electrolyte entering the electrolytic cell between a plurality of modules whose inlets and outlets are connected in parallel, diffusing a flow of electrolyte entering each module so that electrolyte flow is substantially even between one or more intermediate electrodes present in each module, mixing the electrolyte flows between the intermediate electrodes in a gap region or via openings in one or more of the intermediate electrodes, and generally flowing electrolyte in a direction parallel to the intermediate electrodes. The diffusing step preferably comprises blocking electrolyte entering each module from flowing directly between the intermediate electrodes. The method preferably further comprises selecting a low threshold amount of oxidant in an oxidant tank which signals initiation of electrolysis, and initiating electrolysis of the electrolyte when electricity costs are low even though an oxidant amount in the oxidant tank is higher than the low threshold amount.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION OF ILLUSTRATIVE EMBODIMENTS

Embodiments of the present invention are methods and devices whereby an on-site generator electrolytic cell is preferably monitored automatically for buildup of contaminants on the electrode surfaces, and when those contaminants are detected, the electrolytic cell is cleaned automatically (i.e, without operator intervention), thereby providing a simple, low cost, and reliable process for achieving a highly reliable, low maintenance, on-site generator which does not require the typical operator intervention and/or auxiliary equipment (such as a water softener) now required for long life of electrolytic cells.

The internal status of the electrolytic cells can be monitored automatically by monitoring cell inputs and performance. It is known that how much brine a cell consumes is dependent on the amount and type of film buildup on that given cell. If brine flow is continuously monitored, any dramatic change in brine flow to reach a given current at a given voltage is indicative of a potential problem with film buildup within a cell. The invention preferably monitors the flow characteristics of the brine, incoming water, temperature, etc., to determine whether or not there has been contaminant buildup within the electrolytic cell. When potential film buildup is detected in the cell by the control system, the cell is preferably automatically acid washed.

A carbonate detector integrated with an electrolytic cell, automatic acid washing, and device controls may be utilized. A separate electrolytic cell from the one used to create the mixed oxidant or sodium hypochlorite is preferably used to create the acid on site and on demand and to provide the acid for removing of contaminants in the electrolytic cell used for creating the sodium hypochlorite or mixed oxidants. Alternatively a reservoir is used to store concentrated acid onsite for cleaning the cell, and monitoring that acid reservoir and alarming operators when that acid reservoir would need to be refilled, as well as optionally diluting the acid to a desired concentration prior to washing the cell. An ultrasonic cleaning methodology for automatically removing unwanted contaminants when the contaminants are detected by the methods described above may also be integrated into the present invention.

Figure 1:
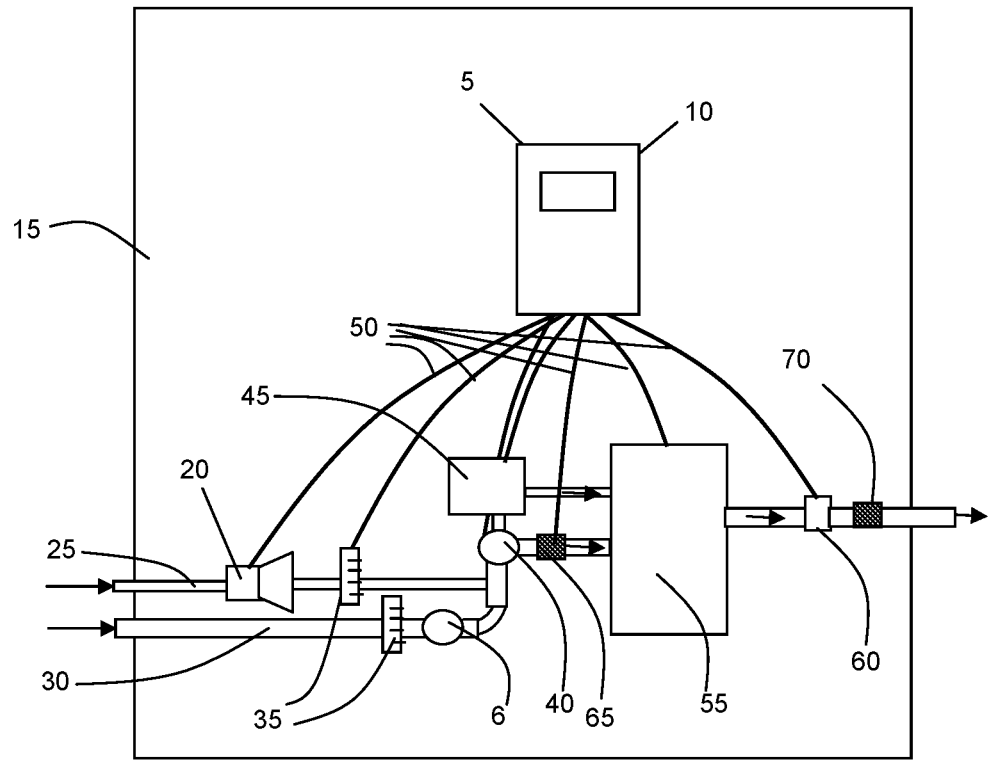
FIG. 1 is a diagram of one embodiment of a low maintenance on-site generator unit.

An embodiment of the present invention is shown in FIG. 1. All of the components of this device are preferably mounted to back plate 15. The controls and power supplies for all the separate components shown in this embodiment are all preferably contained within control box 5, but may alternatively be located wherever it is convenient, preferably as long as there are master controls for the overall operation of the apparatus.

Control box 5 preferably shows the status of the unit via display 10, and the master controls as well as electrical power and/or component signals are preferably carried via electrical connections 50 between control box 5 and the various individual components. Water (preferably soft water) preferably enters the system through water entrance pipe 30, and brine preferably enters the system through brine entrance pipe 25. Brine, preferably stored in a saturated brine silo or tank, is preferably pumped via variable speed brine pump 20, which is preferably controlled and powered by electrical connection 50. The brine then preferably passes through flow meter 35, which can be electrically monitored via electrical connection 50. The control system can control the flow rate of the brine by increasing the speed of variable speed brine pump 20.

When the electrolytic generator is in normal operation mode and is at target current and target voltages, the total flow through the electrolytic cell 55 can be monitored, for example by a flowmeter, rotameter, or pressure transducer, or by monitoring the change in temperature across the electrolytic cell 55 by monitoring inlet thermowell 65 and exit thermowell 70. When control box 5 determines that flow is off target, for example in response to fluctuations in incoming pressure and/or flow to the electrolytic generator, it preferably automatically adjusts flow by changing electronically controlled cell inlet valve 6. In this way, the cell can always operate near target flow levels and will not routinely require measurement or adjustment of incoming flows.

Data from any of the following sources (or combinations of data from any of these sources) is preferably used to determine the volumetric flow rate of brine: flow meter 35, carbonate detector 60, electrolytic cell 55, acid generating electrolytic cell 45, and/or thermowells 65, 70. Valve 40 can direct flow either to electrolytic cell 55 or to acid generating electrolytic cell 45. Valve 40 typically flows an electrolyte comprising diluted brine (as both the concentrated brine and water inflows have preferably been plumbed together and the brine has been diluted before it reaches valve 40) to electrolytic cell 55. In this standard operating configuration, the system produces, for example, mixed oxidants or sodium hypochlorite.

As contaminants build up on carbonate detector 60, which may be located elsewhere according to the present invention, carbonate detector 60 sends a series of signals to control box 5, preferably via electrical connections 50, which indicate whether or not a contaminant film is building up on electrolytic cell 55. When carbonate detector 60 indicates that there is contaminant film, control box 5 preferably begins an acid cleaning cycle in the device, wherein valve 40 is actuated via electrical connection 50 to force diluted brine through acid generating cell 45, which is also preferably energized by control box 5 via electrical connections 50. The system preferably runs brine pump 20 to flow at a rate (as measured by flow meters 35) which has been optimized for optimal acid creation in acid generating electrolytic cell 45. In this embodiment, the acid created in acid generation cell 45 preferably flows through electrolytic cell 55, where it preferably cleans the contaminants, then flows through carbonate detector 60. The system preferably runs in this acid cleaning mode until carbonate detector 60 sends a signal to control box 5 indicating that the system is clean and can begin running again in standard mixed oxidant or sodium hypochlorite production mode. The acid used to clean electrolytic cell 55 is preferably dumped to a separate waste drain after flowing through carbonate detector 60 instead of dumping it to the oxidant storage tank. Electrolytic cell 55 may optionally be cleaned with an ultrasonic horn and/or a magnetically actuated electrode mechanical cleaning apparatus in addition to or in place of using an acid generating cell.

In an alternative embodiment, concentrated acid is stored in a reservoir. During the acid cleaning cycle, control box 5 preferably activates a pump or valve to allow flow of the acid to electrolytic cell 55. The reservoir is preferably large enough to accommodate many different acid wash cycles. Some of that acid may potentially be diluted with standard incoming water to clean electrolytic cell 55.

If carbonate detector 60 (or any other contaminant detecting component) is not used, electrolytic cell 55 preferably may be cleaned on a predetermined cleaning schedule to ensure contaminants do not ruin electrolytic cell 55. Typically this cleaning schedule would be based upon the number of hours that the electrolytic cell had been running since the last cleaning was completed, and is preferably frequent enough to ensure that there is no excessive contaminant buildup on the electrolytic cell.

The rate of brine consumption may optionally be used to determine the presence of contaminants in electrolytic cell 55. In normal operation in a clean cell, the rate of brine consumption is steady and measurable. As carbonate scale builds up within electrolytic cell 55, the carbonate layer acts as an electrical insulator between the anode and cathode within electrolytic cell 55. To compensate for this insulating effect, and to maintain the amperage within electrolytic cell 55, the rate of brine consumption increases to increase the conductivity within electrolytic cell 55. This increased rate of brine consumption is compared to the normal rate of brine consumption. Flow through electrolytic cell 55 can also be used to measure contaminant buildup within electrolytic cell 55. Flow can be measured indirectly by measuring the temperature rise through electrolytic cell 55, for example by comparing the temperature difference between two thermocouples or inlet thermowell 65 and cell discharge thermowell 70. When carbonate buildup is detected by any of these means, electrolytic cell 55 can be cleaned by any of the methods or components described above. Brine consumption may be measured using brine flow rate, tachometer rates of brine pump 20, or incoming water flow rates.

In addition to (or instead of) the cleaning methods described above, the electrolytic cell may optionally be cleaned by reversing the polarity of the electrodes in electrolytic cell, while flowing electrolyte through the electrolytic cell or not, and preferably for a very short duration. Reversing the polarity of the electrodes, preferably at low current densities, lowers the pH at the cathode, which dissolves and removes the contaminants. However, the dimensionally stable anode in the chlorine (4 to 8 gm/L) producing electrolytic cell described herein typically operates well at high current densities (up to 2 amps per square inch), but would fail quickly if polarity were reversed at the same current density. Thus it is preferable to use a separate power source at lower current density and/or lower plate to plate voltages to clean the cell in reverse polarity mode, which is only operated when the normal chlorine production operational mode is in standby, so that the primary anode coating remains undamaged. Under these conditions, cleaning cycles of less than 30 minutes can be achieved, preferably ranging between approximately 5 minutes and 10 minutes. Industry experience indicates that cell cleaning intervals of less than a week would represent an unfavorable situation where the feed water to the electrolytic cell, or the salt used to make the brine solution, would typically be poor quality. Intervals between cleaning of greater than one week are clearly the industry norm. Under the worst case condition of cleaning once per week, the loss of system duty cycle (production operation mode) would still be negligible.

In any embodiment using reverse polarity to clean the electrolytic cell, both the anode and cathode surfaces of both primary and bi-polar electrodes are preferably coated with an appropriate dimensionally stable anode coating.

Figure 2:
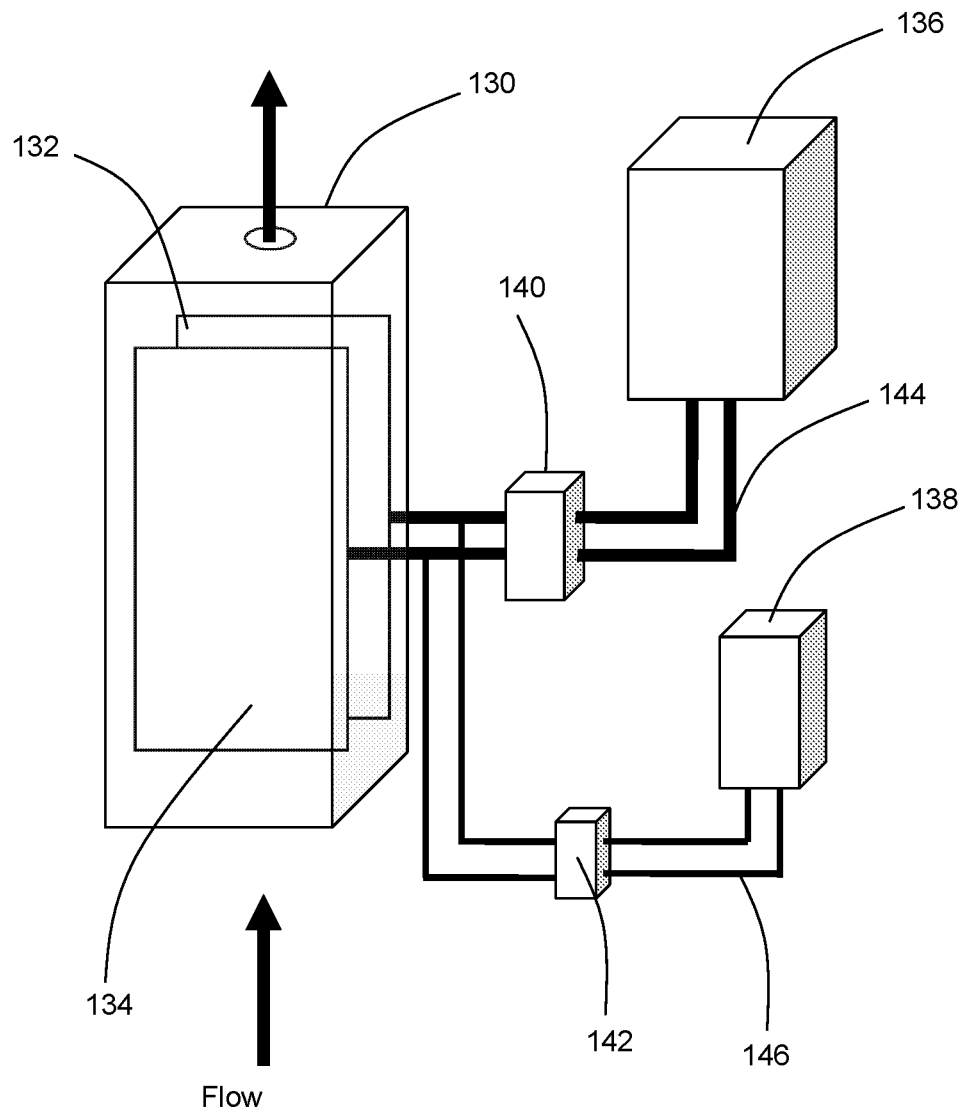
FIG. 2 is a schematic of a reverse polarity system for electrolytic cell cleaning.

FIG. 2 is a schematic of an embodiment of a system for implementing reverse polarity cleaning. Electrolytic cell 130 comprises anode 134 and cathode 132 with electrolyte flowing in at the bottom and oxidant flowing out at the top of the cell. In normal operation, electrolytic cell 130 has electrical energy applied to anode 134 and cathode 132 via main power supply 136. Periodically, electrolytic cell 130 will be cleaned by reversing the polarity on anode 134 and cathode 132, effectively making anode 134 the cathode, and cathode 132 the anode. In the normal mode of production where the system is producing a chlorine based disinfectant, the current density on anode 134 is preferably between approximately 1 and 2 amps per square inch. To avoid damage to anode 134 during the reverse polarity cleaning step, the current density is preferably less than approximately twenty percent of the normal operating current density range, and more preferably between about 10% and 15% of the normal operating current density range. Because the reverse polarity cleaning operation operates at much lower power settings, power is preferably supplied by cleaning power supply 138, which can be much smaller than main power supply 136. Power from main power supply 136 is transferred to electrolytic cell 130 preferably via main power cables 144. Power from cleaning power supply 138 is transferred to electrolytic cell 130 preferably via cleaning power cables 146. The power supplies are preferably isolated via main power supply relay 140 and cleaning power supply relay 142. In normal operation when chlorine is being produced within electrolytic cell 130, main power supply 136 is energized and main power supply relay 140 is closed. To avoid backflow of current to cleaning power supply 138 with the wrong polarity, cleaning power supply relay 142 is open. Likewise, when electrolytic cell 130 is operating in cleaning mode, cleaning power supply 138 is energized, main power supply 136 is de-energized, main power supply relay 140 is open, and cleaning power supply relay 142 is closed. By utilizing less current density and/or lower potentials on anode 134 during the short cleaning cycle, damage to anode 134 or cathode 132 due to the cleaning cycle is negligible.

An alternative embodiment to the one shown in FIG. 2 uses the main power supply 136 to provide power for normal operation as well as the cleaning cycles. This approach preferably employs the use of power supply relays 142 or other switching devices to reverse the polarity. Typically this approach requires the electrolytic cell brine concentrations during the cleaning cycle to be much less than in normal operation. With this approach, however, it is still preferable that the cleaning cycle be performed at lower current densities and/or lower potentials for short periods of time.

Figure 3:
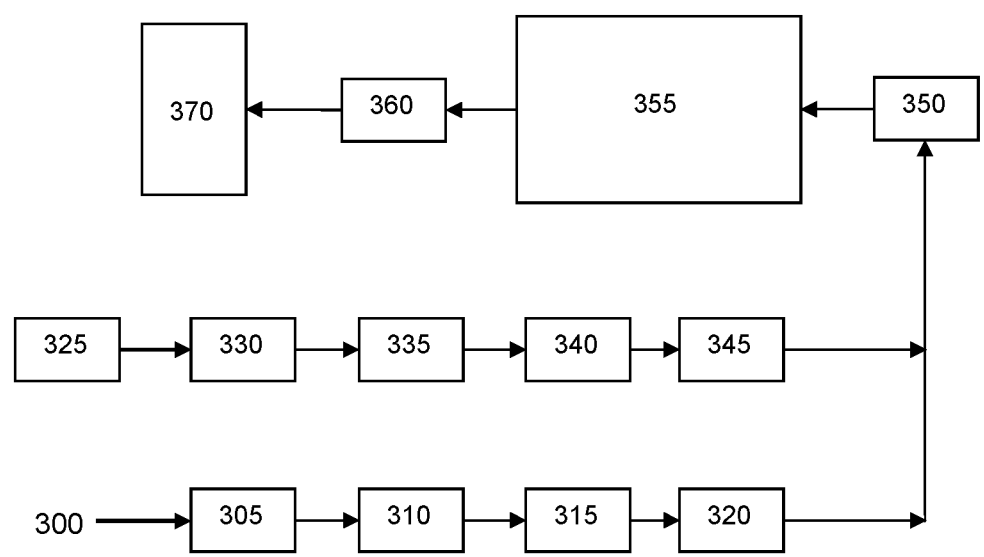
FIG. 3 is a diagram of an embodiment of an on-site generator in accordance with the present invention.

FIG. 3 is an embodiment of an on-site generator of the present invention. Brine from storage tank 325 preferably passes through brine filter 330, on-off solenoid 335, variable speed brine pump 340, and check valve 345 before it is mixed with water. Brine filter 330 is preferably located outside the generator enclosure for easy access for filter replacement. Solenoid 335 is used to stop brine flow during cleaning, as described below, and also prevents over-pressure brine from seeping into electrolytic cell 355. Check valve 345 prevents softened water from backflowing into the brine line. Flow 300 of water (preferably softened water) preferably passes through flow sensor 305, such as a rotameter, past pressure transducer 310, through flow control valve 315, and through before it is mixed with brine. Pressure reducing valve 320 preferably reduces the pressure of the incoming water, which may be as high as 60 psi, to the pressure at which electrolytic cell 355 operates, which is preferably approximately 5-6 psi. Pressure reducing valve 320 also prevents the electrolytic cell from being subjected to high pressures, which may cause a rupture disk or other similar device to blow. The water/brine solution (electrolyte) preferably passes through inlet thermowell 350 before it enters electrolytic cell 355. After electrolysis the mixed oxidants preferably exit the cell through outlet thermowell 360 before being stored in oxidant storage tank 370. In this embodiment the water flow and brine flow rates are preferably separately and/or automatically controllable. By separately monitoring and preferably automatically controlling the water flow, a consistent flow rate can be provided to the electrolytic cell, even if the incoming water pressure or flow rate fluctuates. In case of large fluctuations, this control enables a smooth shutdown of the system until the inlet water pressure is within specified limits again. This enables greatly enhanced control of the electrolytic process. Dual processors, one for flow control and the other for controlling the cell power supply, may be employed.

As described above, reverse polarity cleaning is preferably carried out at a lower current density than that used for normal cell operation. Typically this current density can be achieved by one or more of the following: lowering the voltage, lowering the salinity of the electrolyte (e.g. the brine concentration), and/or lowering the operating temperature (since the resistivity of water rises as the temperature decreases). An embodiment of the present invention preferably performs reverse polarity cleaning according to the following procedure:

1) Turn off the brine flow.
2) Flush the electrolytic cell preferably with soft water, preferably for approximately one to three minutes, thus reducing salinity and temperature in the cell. The current typically spikes to a number higher than the desired cleaning current density (the desired cleaning current density may be, for example, 10 A, if the normal operating current density is 75 A, or about 10%-15% of the normal operating current density);
3) Continue to flow water through cell until the cell salinity and temperature is low enough (i.e. the resistivity of the solution in the cell is high enough) so that the current falls below the desired cleaning current density.
4) Turn off the water flow; the cell is now preferably substantially filled with water.
5) Reverse the polarity of the power cell, preferably keeping the voltage constant. Since the cell is operating, the cell temperature typically increases, thereby increasing the current due to the decreased resistivity of the hotter water.
6) When the current reaches approximately the desired cleaning current density, turn on the water flow again.
7) Repeat steps 3-6 approximately every 30 seconds or less for the desired cleaning duration, for example approximately 3-5 minutes;
8) Flush debris from the cell for approximately 30 seconds, then proceed to normal operational startup.

In addition to keeping the desired cleaning current density approximately at or below a desired value, this throttling of the water flow also has the physical effect of dislodging contaminants such as scale flakes from the cell. This procedure is enabled by use of an automatic water flow control valve, such as a solenoid controlled valve, PWM valve, or 0-5V valve, which is controlled by the measured current density. Water flow may be controlled by a PID (proportional-integralderivative) controller, which preferably uses flow rate, pressure, and/or temperature as control inputs.

If the current at turn on in step (2) doesn't spike above the desired cleaning current density, or if the current doesn't reach that level in step (6), then brine may optionally be injected into the cell during the cleaning procedure in order to increase the current density to the desired level. Then the procedure may be continued as described above.

The system preferably normally operates when the level of the oxidant storage tank, which contains the output of the electrolytic cell, is between a preset low level and a preset high level. In other words, the system preferably automatically turns on when the tank is low and turns off when the tank is full. The cleaning procedure is preferably initiated when the system indicates that cleaning is required (for example after a preset period of time or operation time, e.g. 720 hours, or preset amount of flow, or when contamination is measured and reaches a maximum desired level) AND when the oxidant tank has sufficiently emptied to be at the preset low level. This ensures that normal operation will resume immediately after the cleaning step, thereby flushing any contaminants or debris out of the cell (and into the oxidant tank, which is easily cleaned) before they have a chance to settle. Furthermore, the cleaning operation preferably does not appreciably dilute the oxidant solution stored in the oxidant storage tank.

During the above reverse polarity cleaning procedure the cell is subjected to a certain amount of amp-seconds. For example, a three minute cleaning period run at 10 A would result in a total of 1800 A-sec. The time and current may alternatively be chosen to be at different values which give approximately the same (or similar) A-sec value. For example, a 30 second cleaning period may be run at 60 A, thus giving the same total of 1800 A-sec. This may result in the same cleaning efficacy, but allows for shorter cleaning time periods, thus potentially allowing for cleaning to be performed more frequently. However, care must be taken so that the higher reverse polarity cleaning current density doesn't damage the anode. (Such higher current density is still preferably less than or equal to the normal operational current density.) A typical cleaning cycle may be run as infrequently as five minutes once a month.

Figure 4:
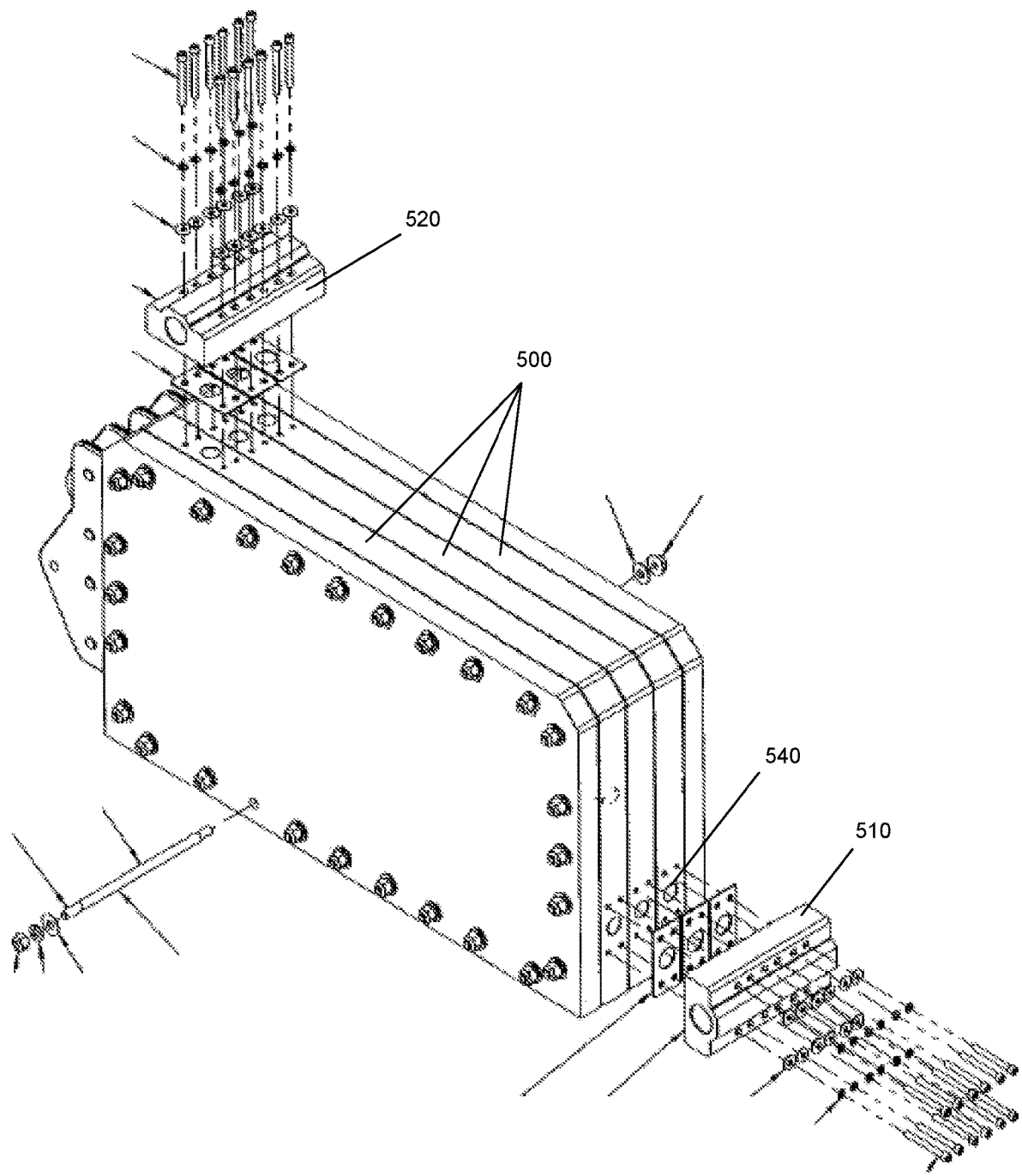
FIG. 4 is an isometric view of an embodiment of a cell of the present invention, for example for use with the on-site generator of FIG. 3.

FIG. 4 is a view of an embodiment of a bipolar cell of the present invention. The cell is preferably a horizontal flow cell. The cell shown comprises a plurality of modules 500, each preferably separated by a primary electrode and sealed by an o-ring or similar seal. Each module preferably comprises one or more intermediate electrodes (not shown). As can be seen, flow of electrolyte into each module (via inlet manifold 510), and oxidant out from each module (via outlet manifold 520), occurs in parallel. Inlet manifold 510 preferably provides equal flow to all modules in parallel. Not only is the flow through the cell preferably parallel to each of the electrodes, but also the cells are preferably arranged in parallel with one another with respect to the flow. Other cells known in the art are configured in series, so that the electrolyte/oxidant flowing into one module comes from the output of the previous module. The configuration of this embodiment allows for a single defined footprint for the product, regardless of the number of modules used. In contrast, series systems require vastly different footprints depending on the number of modules used. In addition, because the electrolyte quality varies greatly from module to module in series systems, certain modules wear out faster must be replaced frequently, or the modules must be rotated. In contrast, with a parallel system, the electrolyte entering each module is exactly the same for each module. Thus the modules wear evenly. (Typically the entire cell is replaced when the modules eventually wear out.)

Figure 5A:
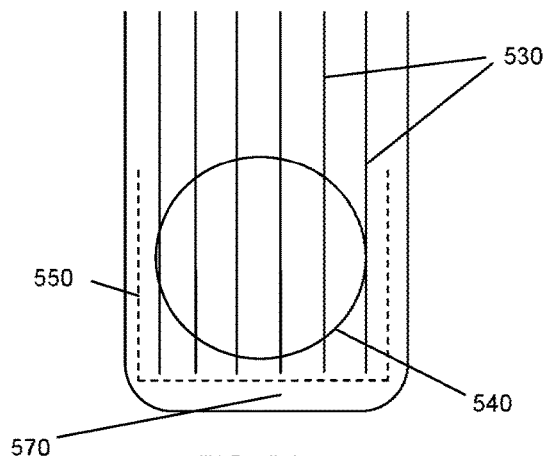
FIG. 5A is a cutaway end view of the inlet side of a module of the cell of FIG. 4.

FIG. 5A is a cutaway end view of the inlet end of one of the modules of the cell of FIG. 4 The module preferably comprises one or more preferably parallel intermediate electrodes 530. In this figure, the flow direction of the electrolyte entering the module is into the page. The module preferably comprises flow barrier 550 which blocks electrolyte from flowing directly into the cell, forcing it down into, for example, distribution area 570 and around flow barrier 550, thereby distributing the electrolyte entering the module from inlet 540 substantially evenly between all of the intermediate electrodes. Flow diffuser barrier 550 may be rigid or flexible, and may comprise a chemically resistant material such as chlorinated polyvinyl chloride (CPVC) or Viton®.

Figure 5B:
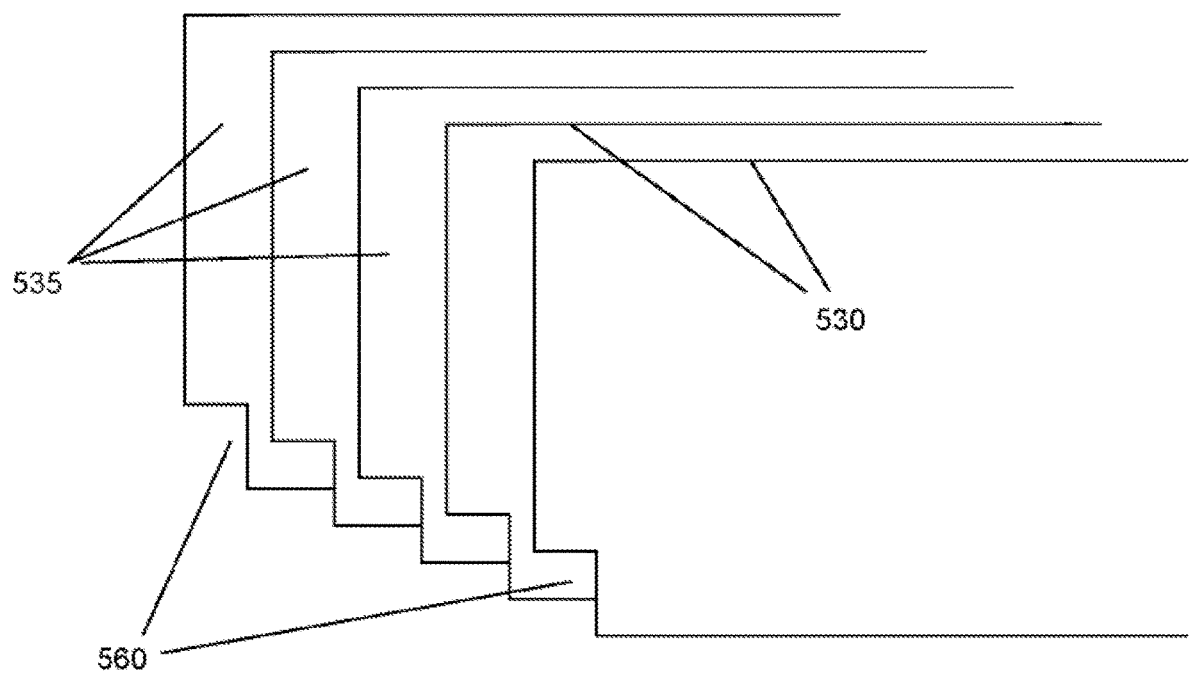
FIG. 5B is a perspective view of the outlet side of a module of the cell of FIG. 4.

FIG. 5B is a perspective view of the outlet end of one of the modules of the cell of FIG. 4. Each intermediate electrode 530 is preferably configured via extension 535 to form gap 560. Although gap 560 is shown at the bottom of intermediate electrode 530, it may alternatively be located anywhere along the edge of intermediate electrode 530. More than one gap may optionally be used. Gap 560 preferably facilitates mixing of the flows exiting the intermediate electrodes, thus helping to ensure that there are equivalent flows between all of the intermediate electrodes, and thereby improving cell efficiency. Alternatively, the electrode may be rectangular and an edge protector may comprise extension 535, configured to form gap 560. The edge protector serves to hold the intermediate electrodes in the cell and preferably comprises chlorinated polyvinyl chloride (CPVC) and preferably comprises a plurality of grooves, each for receiving an intermediate electrode. The edge protector and/or another edge protector along a different side of the electrodes may optionally comprise a compressible Viton® gasket, which has significant cost advantages. Using such a gasket on one edge allows for cost reduction without significantly sacrificing rigidity. Any of the edge protectors is preferably replaceable by an edge protector having a different width. This enables the same cell enclosure to be used for different sized intermediate electrodes, which may be used in systems with different chemistries and/or electrode coatings.

Figure 6:
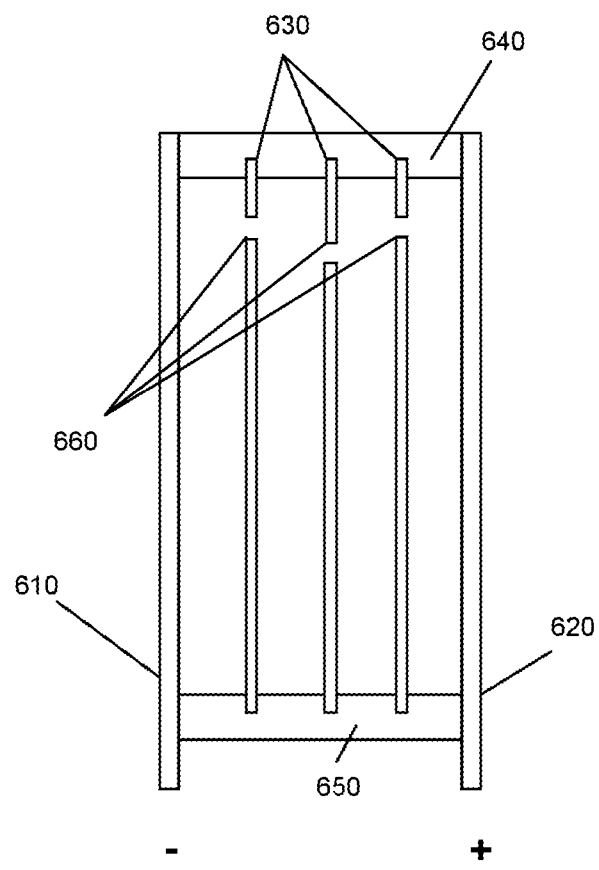
FIG. 6 is a cross section view of an alternative module.

FIG. 6 is a cross section of an alternative embodiment of an electrolytic cell in accordance with the present invention comprising primary electrodes 610, 620, intermediate electrodes 630, and edge protectors 640, 650. Each intermediate electrode preferably comprises one or more holes or openings 660. These openings preferably help to balance the electrolyte flow throughout the electrolytic cell, resulting in better cell efficiency. The openings on each intermediate electrode are preferably staggered or offset from the openings on the adjacent intermediate electrode(s), thus providing a tortuous path for electrons such that the vast majority of electrons are forced to travel through the catalytic electrode coatings.

Power Saver Programming

During normal operation, if the oxidant storage tank is at a predetermined low level, the system preferably turns on and produces more oxidant, and stops when the level reaches a predetermined high level. The system does not ordinarily turn on if the level of oxidant in the oxidant tank is between the high and low levels. However, in order to save electricity costs, before the oxidant level falls to the low level (i.e. when the level of oxidant in the oxidant tank is between the high and low levels), embodiments of the present system may be turned on during times when electricity costs are least expensive in order to "top off" the tank, thus preempting later operation when electricity is more expensive and the oxidant level falls to the low level.

Although the invention has been described in detail with particular reference to the described embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed:

1. A bipolar electrolytic cell for producing an oxidant, comprising:
   a plurality of modules arranged in parallel, each module comprising primary electrodes and one or more intermediate electrodes and each module defining an inlet end having an inlet;
   a manifold for distributing electrolyte substantially evenly between each module;
   a flow barrier in each module, the flow barrier positioned to deflect fluid entering the module from the inlet of the module toward a distribution area defined within the module; and wherein
   (i) an intermediate electrode has an extension beneath which extension electrolyte can flow, or
   (ii) an intermediate electrode has an opening formed therein, through which opening electrolyte can flow;
   wherein a general flow direction of electrolyte in each module is parallel to the electrodes.

2. The bipolar electrolytic cell of claim 1, wherein the flow barrier blocks electrolyte entering each module from flowing directly between the electrodes.

3. The bipolar electrolytic cell of claim 1, wherein an intermediate electrode has an extension beneath which extension electrolyte can flow beneath the intermediate electrode.

4. The bipolar electrolytic cell of claim 1, wherein an intermediate electrode has an opening formed therein, through which opening electrolyte can flow.

5. The bipolar electrolytic cell of claim 1, wherein a module of the plurality of modules comprises a gasket that comprises one or more grooves for receiving and holding the intermediate electrodes.

6. The bipolar electrolytic cell of claim 5 wherein the gasket comprises chlorinated polyvinyl chloride (CPVC).

7. The bipolar electrolytic cell of claim 5, wherein the gasket is replaceable by a different size gasket, thereby enabling a single module housing to accommodate different sizes of intermediate electrodes.

8. The bipolar electrolytic cell of claim 1, wherein the openings of an intermediate electrode of a module of the plurality of modules are staggered or offset from openings in an adjacent intermediate electrode of the module.

9. A method of operating a bipolar electrolytic cell, the method comprising:
   with a manifold, substantially evenly distributing a flow of electrolyte entering the electrolytic cell between a plurality of modules arranged in parallel,
   each module comprising primary electrodes and one or more intermediate electrodes,
   each module comprising an inlet and a flow barrier located inside the module, the flow barrier deflecting fluid entering the module from the inlet of the module toward a distribution area defined within the module, and
   each module being configured for electrolyte flow generally parallel to the electrodes of the module;
   distributing a flow of electrolyte entering each module with a distribution area defined within each module such that the electrolyte flow is substantially even between one or more intermediate electrodes present in each module;
   mixing the electrolyte flows (i) between the intermediate electrodes in a space between intermediate electrodes of a module or (ii) through one or more openings present in one or more of the intermediate electrodes; and
   flowing the electrolyte in a direction generally parallel to the intermediate electrodes.

10. The method of claim 9, wherein the distributing comprises blocking electrolyte entering each module from flowing directly between the intermediate electrodes.

11. The method of claim 9, further comprising:
    selecting a low threshold amount of oxidant in an oxidant tank, which amount signals initiation of electrolysis; and
    initiating electrolysis of the electrolyte when an oxidant amount in the oxidant tank is higher than the low threshold amount.

* * * * *